United States Patent Office 3,446,866
Patented May 27, 1969

3,446,866
ALKYLATION PROCESS
Hugh Walter Stern, London, and John Robert Jones, Walton-on-Thames, England, assignors to The British Petroleum Company Limited, London, England, an English corporation
No Drawing. Filed May 29, 1967, Ser. No. 642,231
Claims priority, application Great Britain, June 3, 1966, 24,767/66
Int. Cl. C07c 3/56
U.S. Cl. 260—671            12 Claims

ABSTRACT OF THE DISCLOSURE

An alkylation process uses the reaction product of an aluminum halide and a cobalt halide as a homogeneous catalyst. The alkylation is performed at a temperature between 20° C. and 200° C. Usually an aromatic compound is alkylated by an olefin at the reflux temperature of the mixture. In an example 5 g. of aluminum chloride and 2 g. of cobaltous chloride were added to a litre of dry benzene and refluxed for 24 hours under nitrogen 200 g. of the resulting solution was decanted off and refluxed while 200 ml./min. ethylene was bubbled through at atmospheric pressure. The mixture was stirred vigorously throughout. After an hour no more ethylene was being absorbed and a small quantity of water was added to decompose the catalyst. 6% of the benzene was converted to a product containing 91.5% ethylbenzene 7.8% triethylbenzene and 0.7% of higher polyalylbenzenes. Air and moisture were carefully excluded from the catalyst during its preparation and use.

---

This invention relates to a process for the alkylation of an aromatic compound.

It is known that aluminum chloride as the sole active entity is a Friedel-Crafts catalyst useful as an alkylation catalyst. Aluminum chloride is but sparingly soluble in most organic liquids, including alkylatable compounds and alkylation diluents, such as paraffinic hydrocarbons. The solubility of aluminum chloride is so low that even a saturated solution of aluminum chloride is ineffective for commercial use as an alkylation catalyst unless there is also a reservoir of solid aluminum chloride present. Thus, in general, if aluminum chloride is employed, then a heterogeneous alkylation system results.

Heterogeneous systems are more difficult to control and are less reproducible in activity than homogeneous systems.

It is also known that cobalt chloride, by itself or in the presence of an inert diluent, is inactive insofar as alkylation is concerned.

We have now discovered that the soluble reaction product of an aluminum halide and a cobalt halide is an effective alkylation catalyst.

Thus according to the present invention there is provided a process for the production of an alkylated compound which process comprises alkylating an alkylatable compound with an alkylating agent in the presence of a homogeneous catalyst comprising a reaction product of an aluminum halide and a divalent transition metal halide at a temperature in the range −40° C. to +200° C.

The preferred transition metal halides are those of Groups VII and VIII of the Periodic Table according to Mendeleef. Cobalt halides are particularly useful and cobalt chloride is a preferred catalyst component. The preferred aluminum halide is aluminum chloride.

The reaction pressure is not critical and may be atmospheric, superatmospheric or subatmospheric.

Alkylation is conveniently carried out at the reflux temperature of the reaction medium.

Suitable alkylatable compounds include aromatic hydrocarbons such as benzene, cumene, naphthalene etc., isoparaffins and cycloparaffins having 6 or more carbon atoms per molecule. Other aromatic compounds such as phenols, ethers, aryl esters, aldehydes, substituted amines, etc., may also be alkylated to a limited extent, but oxygen-containing compounds and amines have a pronounced deactivating effect on the catalyst.

Suitable alkylating agents include olefins, e.g., ethylene, propylene, dodecene, propylene tetramer, hexene dimer, etc., and alkyl halides, e.g., sec butyl chloride or t butyl chloride.

Alkylation may be effected in the presence or absence of an inert diluent.

Suitable diluents include normally liquid saturated hydrocarbons, e.g., cyclohexane and heptane. The reaction between the aluminum halide and the transition metal halide may be effected by heating them in the presence of a hydrocarbon solvent.

Preferably the aluminum halide is extracted with condensed vapours from a boiling suspension of the transition metal halide in the organic solvent, for example in a Soxhlet system.

Alternatively, the catalyst may be prepared by refluxing a suspension of both the aluminium halide and the transition metal halide in a solvent.

The advantage of the former method is that resublimation of dry aluminium halide is unnecessary and relatively strong catalyst solutions can be prepared consistently.

The reaction product in either case is sparingly soluble in the solvent but the resulting solution is an effective alkylation catalyst.

Suitable solvents are cyclohexane, benzene and chlorobenzene. Heptane and other noncyclic paraffins are not suitable. Toluene and xylene cannot be used without extensive reaction with aluminium halide resulting in tarry products.

When cobaltous chloride and aluminium chloride are used as catalyst components, excess aluminium chloride should always be present in the catalyst solution. In consequence, the molar ratio Al:Co should always be greater than 2:1. It is believed that in this case the catalyst solution contains the complex $Co(AlCl_4)_2$ and free $AlCl_3$.

The catalyst should be preserved from contact with water, oxygen, alcohols, ethers, amines, phosphines, sulphur compounds, dienes, acetylenes, carbon monoxide and other complexing ligands which react strongly with transition metal compounds and thereby reduce the catalytic activity or inhibit alkylation.

EXAMPLE 1

Resublimed aluminium chloride (5 g.) and anhydrous cobaltous chloride (2 g.) were added to dry benzene (1 litre) and the mixture was refluxed for 24 hours under nitrogen.

A portion of this solution (200 g.) was decanted from the excess solid chlorides and boiled under reflux while ethylene (200 ml./min.) was bubbled through at one atmosphere pressure, the solution being vigorously stirred. After one hour, the ethylene uptake had ceased and a small amount of water was added to decompose the catalyst-containing oil which had separated from the benzene solution. Analysis showed that 6 percent of the benzene had been converted into a product which had the composition ethylbenzene, 91.5 percent; diethylbenzene, 7.8 percent; higher boiling polyalkylbenzene, 0.7 percent.

EXAMPLE 2

A portion of the catalyst solution (200 g.) prepared as in Example 1 was boiled under reflux while propylene (200 ml./min.) was bubbled through at one atmosphere pressure, the solution being vigorously stirred. After 1.5 hours, the reaction was stopped at a benzene conversion of 27 percent. The alkylated product had the composition 85 percent isopropylbenzene and 15 percent di-isopropylbenzene.

EXAMPLE 3

Using the same procedure as in Example 2, the reaction was stopped after 3 hours at a benzene conversion of 73 percent. The product composition was 56 percent isopropylbenzene and 44 percent di-isopropylbenzenes, no tri-isopropylbenzenes being formed.

EXAMPLE 4, 5, 6, 7, 8, 9

These examples relate to the alklation of benzene with olefins and alkyl halides using the catalyst solution prepared as in Example 1. The catalyst solution was heated or cooled to the reaction temperature under atmospheric pressure and the olefin or alkyl halide was added dropwise to the stirred catalyst solution over a period of 30 minutes. The reaction products were washed with 10 percent sodium hydroxide solution and water to remove the catalyst. The results are shown in the table below.

ALKYLATION OF BENZENE

Catalyst: $AlCl_3/CoCl_2$/benzen

| Example | Olefin of alkyl halide | Temp., °C. | Mole ratio benzene: reactant | Yield of monoalkylbenzenes, percent of theoretical |
|---|---|---|---|---|
| 4 | Dodecene-1 | 80 | 10:1 | 78 |
| 5 | Hexene dimer | 80 | 10:1 | 75 |
| 6 | Sec-butyl chloride | 10 | 7:1 | 92 |
| 7 | do | 30 | 7:1 | 86 |
| 8 | do | 63 | 5:1 | 94 |
| 9 | t-Butyl chloride | 50 | 7:1 | 75 |

The hexene dimer was produced by the dimerisation of a hexene-2/3 mixture over a silica-alumina catalyst at 65–70° C.

The conversion of benzene to ethylbenzene was limited by the separation of a relatively inactive catalyst-containing oil from the reaction mixture (Example 1). However, in the above Examples 2 to 9, the solutions remained homogeneous throughout and there is hence no limitation upon benzene conversion using olefins or alkyl halides containing more than two carbon atoms.

What we claim is:

1. A process for the production of an alkylated compound comprising alkylating an alkylatable compound with an alkylating agent in the presence of a homogeneous catalyst comprising a reaction product of an aluminum halide and a divalent transition metal halide of a metal of Groups VII or VIII of the Periodic Table according to Mendeleef, at a temperature in the range of about −40° C. to +200° C.

2. A process according to claim 1 in which the divalent transition metal halide is a cobalt halide.

3. A process according to claim 3 in which the cobalt halide is cobaltous chloride.

4. A process according to claim 1 in which the alkylable compound is benzene, cumene, naphthalene, or an isoparaffin or cycloparaffin having 6 or more carbon atoms per molecule.

5. A process according to claim 1 in which the alkylating agent is an olefin or an alkyl halide.

6. A process according to claim 5 in which the olefin is ethylene, propylene, dodecene or proplyene tetramer.

7. A process according to claim 5 in which the alkyl halide is sec butyl chloride or t-butlychloride.

8. A process according to claim 1 in which the alkylation is effected in the presence of an inert diluent.

9. A process according to claim 8 in which the diluent is cyclohexane or heptane.

10. A process according to claim 1 in which the alkylation is effected in the absence of a diluent.

11. A process according to claim 1 in which the catalyst has been prepared by heating the aluminium halide and transition metal halide in the presence of a hydrocarbon solvent.

12. A process according to claim 11 in which the hydrocarbon solvent used in the preparation of the catalyst is cyclohexane, benzene or chlorobenzene.

References Cited

UNITED STATES PATENTS 2,436,665   9/1947   Bloch _____ 260—671
3,014,083   12/1961  Roebuck et al. _____ 260—683.53
3,094,568   6/1963   Hay et al. _____ 260—671

DELBERT E. GANTZ, *Primary Examiner.*

C. R. DAVIS, *Assistant Examiner.*

U.S. Cl. X.R.

260—683.53

UNITED STATES PATENT OFFICE
CERTIFICATE OF CORRECTION

Patent No. 3,446,866                                      May 27, 1969

Hugh Walter Stern et al.

It is certified that error appears in the above identified patent and that said Letters Patent are hereby corrected as shown below:

Column 3, line 23, "benzen" should read -- benzene --.
Column 4, line 8, claim reference numeral "3" should read -- 2 --; line 19, "t-butlychloride" should read -- t-butylchloride --; line 37, "2,436,665" should read -- 2,426,665 --.

Signed and sealed this 22nd day of December 1970.

(SEAL)
Attest:

Edward M. Fletcher, Jr.                            WILLIAM E. SCHUYLER, JR.
Attesting Officer                                          Commissioner of Patents